Dec. 4, 1923.
M. E. SIMES
1,476,111
INNER TUBE FOR PNEUMATIC TIRES
Filed Oct. 18, 1920
Fig. 1
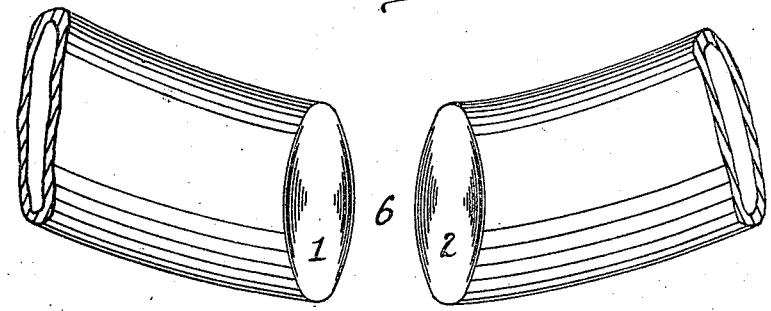
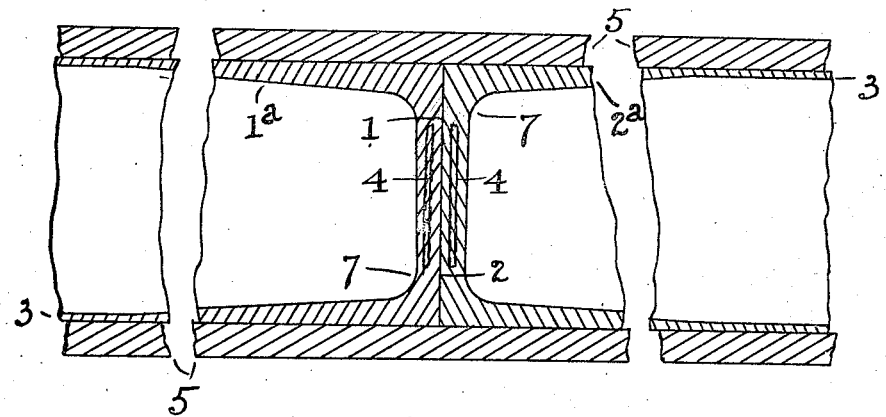
Fig. 2

Patented Dec. 4, 1923.

1,476,111

UNITED STATES PATENT OFFICE.

MONTAGUE ERNEST SIMES, OF BENDIGO, AUSTRALIA.

INNER TUBE FOR PNEUMATIC TIRES.

Application filed October 18, 1920. Serial No. 417,611.

*To all whom it may concern:*

Be it known that I, MONTAGUE ERNEST SIMES, a subject of the King of Great Britain and Ireland, residing at 14 Forest Street, Bendigo, in the State of Victoria, Commonwealth of Australia, have invented certain new and useful Improvements in Inner Tubes for Pneumatic Tires; and I do hereby declare the following to be a full, clear, and exact description of the invention, such as will enable others skilled in the art to which it appertains to make and use the same.

Continuous inner tubes are not used with all pneumatic tires because of the difficulty of removing the wheel, and butt ended tubes are used, such as those having respectively a male and a female end. Correct coupling of such ends is not always easy to effect, and the result of imperfect coupling is damage to the tube, blow-outs, delays, and extra expenses.

I have devised an improved butt ended inner tube which can be inserted in position for inflation without removing the road wheel from the motor cycle or the like, and which lasts longer than an ordinary inner tube having its ends coupled as above mentioned.

My tube may have its ends placed touching one another when the tube is inserted within the outer casing before inflation, but such placing is not necessary; and for that reason less skill is called for when the tube and cover are being assembled. If the ends of my tube are not set adjoining one another they will be forced together, automatically during inflation by the internal air.

In the accompanying drawings Figure 1 shows the ends of my inner tube in perspective.

Figure 2 is a sectional plan showing the ends of my tube within the outer cover.

Each butt end of my tube may have the same construction, with an external surface 1, 2, extending transversely (at or approximately at right angles) to the axis or length of the tube, wedge shaped ends which would overlap being avoided. I make each end of relatively thick rubber which tapers at 1ª 2ª from the end towards the tube body 3 which is of ordinary thin elastic rubber.

In each end 1, 2, I provide a reinforcement or stiffening, such as a disc 4, of stiffer rubber or of expansible like material embedded in the rubber, but if the rubber is made stiff enough this reinforcement is not required. The embedded member should allow of expansion under inflation.

There is a limitation to the thickness of the rubber at and near the tube ends because that thickness must not prevent such expansion (under the internal air pressure) as is necessary to fill the space inside the outer cover 5.

Any space as 6 which may be between the tube ends inside the cover before the tube is inflated, becomes eliminated during inflation, the ends under the internal air pressure meeting as in Figure 2.

As the pressure on each butt end increases, and before it reaches the maximum the butt ends if not adjoining one another travel inside the cover so as to meet, or if one end were retarded the other end would travel to effect contact, acting as a pilot drawing behind it part of the not fully inflated tube.

The inflation is continued to the maximum or suitable travelling pressure after the butt ends meet. Inside each thickened end the form of the surface in my preferred construction is concave or hollowed as at 7. The outer face of any butt end may be modified to be convex or concave, but it will still coincide with the other end. The construction described may be modified in regard to some details while still retaining matter which I claim.

What I claim is:—

1. A pneumatic tire inner tube adapted to be expanded throughout its length by inflation and having two ends which will butt together, each end being of thickened material relatively to the thickness of the body of the tube, and the sides of the tube adjacent the ends being thickened and tapering away from said ends to the thickness of the remainder of the tube.

2. A pneumatic tire inner tube adapted to be expanded throughout its length by inflation and having two ends which will butt together, each end being of thickened material relatively to the thickness of the body of the tube, and the sides of the tube adjacent the ends being thickened and tapering away from said ends to the thickness of the remainder of the tube, and each end being reinforced by an embedded member.

3. A pneumatic tire inner tube adapted to be expanded throughout its length by inflation and having two ends which will butt together, each of said ends having a flat, transverse outer face and being of thickened material relatively to the thickness of the body of the tube, and the sides of the tube adjacent the ends being thickened and tapering away from said ends to the thickness of the remainder of the tube.

In witness whereof I have hereunto set my hand.

MONTAGUE ERNEST SIMES.